United States Patent
Lattin et al.

(10) Patent No.: US 7,870,779 B2
(45) Date of Patent: Jan. 18, 2011

(54) STRUCTURE AND METHOD TO VERIFY DIESEL PARTICULATE FILTER OPERATION

(75) Inventors: Robert M. Lattin, Minneapolis, MN (US); Erich A. Lucht, Arden Hills, MN (US)

(73) Assignee: Thermo King Corporation, Minneapolis, MN (US)

( * ) Notice: Subject to any disclaimer, the term of this patent is extended or adjusted under 35 U.S.C. 154(b) by 321 days.

(21) Appl. No.: 12/108,769

(22) Filed: Apr. 24, 2008

(65) Prior Publication Data

US 2008/0264039 A1    Oct. 30, 2008

Related U.S. Application Data

(60) Provisional application No. 60/913,726, filed on Apr. 24, 2007.

(51) Int. Cl.
G01M 15/10    (2006.01)
(52) U.S. Cl. .................... 73/114.69; 73/114.71
(58) Field of Classification Search ............ 73/114.69, 73/114.71
See application file for complete search history.

(56) References Cited

U.S. PATENT DOCUMENTS

| | | | | |
|---|---|---|---|---|
| 4,922,714 A | * | 5/1990 | Grob et al. .......... | 60/276 |
| 4,937,912 A | * | 7/1990 | Kurz ................. | 15/339 |
| 5,009,064 A | * | 4/1991 | Grob et al. .......... | 60/276 |
| 5,110,747 A | | 5/1992 | Pataschnick et al. | |
| 5,157,340 A | * | 10/1992 | Walton et al. ........ | 324/641 |
| 5,241,367 A | * | 8/1993 | Grob et al. .......... | 356/435 |
| 5,497,099 A | * | 3/1996 | Walton ............... | 324/641 |
| 5,651,248 A | | 7/1997 | Kawamura | |
| 5,852,398 A | * | 12/1998 | Helman .............. | 340/438 |
| 6,432,168 B2 | * | 8/2002 | Schonauer .......... | 95/18 |
| 6,922,639 B2 | | 7/2005 | Kawase et al. | |
| 6,933,151 B2 | | 8/2005 | Bailey et al. | |
| 6,964,694 B2 | | 11/2005 | Rauchfuss et al. | |
| 7,012,678 B2 | * | 3/2006 | Enomoto et al. ...... | 356/237.1 |
| 7,017,338 B2 | | 3/2006 | van Nieuwstadt | |
| 7,081,154 B2 | * | 7/2006 | Schulte et al. ....... | 95/273 |
| 7,157,919 B1 | | 1/2007 | Walton | |
| 7,174,779 B1 | | 2/2007 | Kwon | |
| 7,175,681 B2 | | 2/2007 | Hatanaka | |
| 7,197,868 B2 | | 4/2007 | Yahata et al. | |
| 7,254,212 B2 | * | 8/2007 | Saitoh et al. ........ | 378/47 |
| 7,278,304 B2 | | 10/2007 | Zanini-Fisher et al. | |

(Continued)

OTHER PUBLICATIONS

AVL, AVL Smoke Meter, http://www.avl.com/wo/webobsession. servlet.go/encoded/YXBwPWJjbXMmcGFnZT12a..., 1 page, visited on Apr. 24, 2008.

(Continued)

*Primary Examiner*—Freddie Kirkland, III
(74) *Attorney, Agent, or Firm*—Michael Best & Friedrich LLP

(57) ABSTRACT

A sensor for use with a diesel particulate filter in an exhaust system includes a collection device configured to be positioned downstream of the diesel particulate filter such that particulate matter not captured by the diesel particulate filter accumulates on the collection device. The collection device is configured to visually indicate a rate of particulate matter accumulation on the collection device. The rate of particulate matter accumulation corresponds to filter performance.

22 Claims, 6 Drawing Sheets

U.S. PATENT DOCUMENTS

| | | | |
|---|---|---|---|
| 7,281,369 B2 | 10/2007 | Emi et al. | |
| 7,299,626 B2 | 11/2007 | Barasa et al. | |
| 7,334,401 B2 | 2/2008 | Cheng | |
| 7,648,549 B2 * | 1/2010 | Gargano et al. | 55/523 |
| 7,666,253 B2 * | 2/2010 | Krueger et al. | 96/413 |
| 7,677,031 B2 * | 3/2010 | Knitt | 60/295 |
| 7,707,875 B2 * | 5/2010 | Lee | 73/114.71 |
| 2004/0223882 A1 * | 11/2004 | Bonne et al. | 422/82.05 |
| 2005/0041774 A1 * | 2/2005 | Saitoh et al. | 378/53 |
| 2007/0068147 A1 | 3/2007 | Sun et al. | |
| 2007/0089399 A1 * | 4/2007 | Rhodes et al. | 60/278 |
| 2007/0125075 A1 | 6/2007 | Zanini-Fisher et al. | |
| 2007/0125188 A1 * | 6/2007 | Kreft | 73/864.73 |
| 2007/0158191 A1 | 7/2007 | Berger | |
| 2007/0199378 A1 | 8/2007 | Daoud | |
| 2007/0199380 A1 | 8/2007 | Daoud | |
| 2007/0251221 A1 | 11/2007 | Lueschow et al. | |
| 2008/0028752 A1 | 2/2008 | Lee | |
| 2008/0034738 A1 | 2/2008 | Singh et al. | |

OTHER PUBLICATIONS

AVL, Engine Instrumentation, Application Notes, Measurement of Smoke Values with the Filter Paper Method, 44 pages, Dec. 2001.
AVL, The New Improved AVL Smoke Meter 415S, 5 pages, Aug. 27, 2002.
AVL, AVL 415S Smoke Meter, 4 pages, Jun. 2, 2005.
AVL, AVL 415S Smoke Meter The New Correlation Curve, 2 pages, Oct. 15, 2002.
AVL, Optional Heating of Smoke Meter 415S, 2 pages, Feb. 6, 2002.
AVL, Option Special Sampling for Smoke Meter 415S, 3 pages visited on Apr. 24, 2008.

* cited by examiner

STRUCTURE AND METHOD TO VERIFY DIESEL PARTICULATE FILTER OPERATION

CROSS-REFERENCE TO RELATED APPLICATIONS

This application claims priority to U.S. Provisional Patent Application No. 60/913,726, filed Apr. 24, 2007, the entire contents of which are hereby incorporated by reference.

BACKGROUND

The present invention relates to a diesel particulate filter (DPF). More particularly, the present invention relates to a structure and method to verify that the DPF is operating properly.

Typically, a DPF is mounted in an exhaust system to remove diesel particulate matter and soot from exhaust generated by a diesel engine. During use, the DPF may rupture or breach, allowing the exhaust to bypass all or a portion of the DPF without being filtered. Additionally or alternatively, a leak may form in an outer housing of the DPF such that some exhaust flows around the DPF, rather than through the DPF.

Currently, some methods, such as pressure measurements, are used to check and ensure proper functioning of DPF equipment. However, these methods infer proper DPF function or operation by measurement of a related parameter, such as exhaust back pressure, rather than a direct quantification of the DPF operation.

SUMMARY

In one embodiment, the invention provides a sensor for use with a diesel particulate filter in an exhaust system. The sensor includes a collection device configured to be positioned downstream of the diesel particulate filter such that particulate matter not captured by the diesel particulate filter accumulates on the collection device. The collection device is configured to visually indicate a rate of particulate matter accumulation on the collection device. The rate of particulate matter accumulation corresponds to filter performance.

In another embodiment, the invention provides an exhaust system for an internal combustion engine. The exhaust system includes a diesel particulate filter configured to be positioned downstream of the internal combustion engine to capture particulate matter exhausted from the internal combustion engine. The exhaust system also includes a collection device positioned downstream of the diesel particulate filter such that particulate matter not captured by the diesel particulate filter accumulates on the collection device. The collection device is configured to visually indicate a rate of particulate matter accumulation on the collection device. The rate of particulate matter accumulation corresponds to filter performance.

Other aspects of the invention will become apparent by consideration of the detailed description and accompanying drawings.

DETAILED DESCRIPTION

Figure 1:
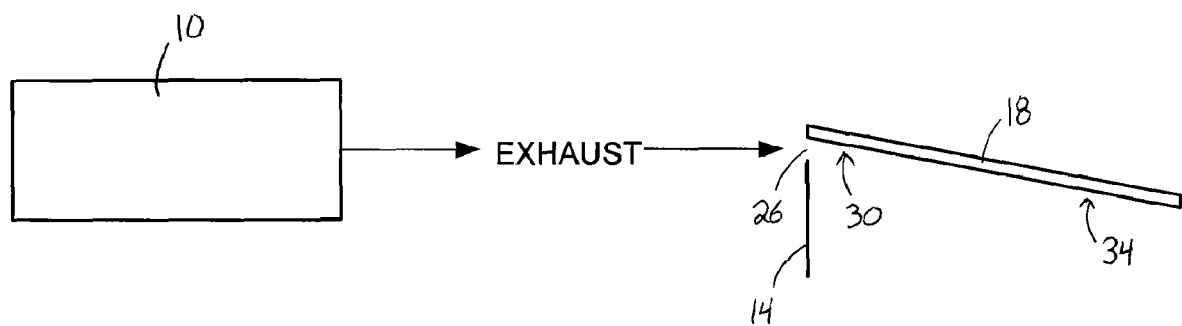
FIG. 1 schematically illustrates a collection device for use with a DPF according to an embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings. Additionally, directions of flow (e.g., left to right, top to bottom, etc.) illustrated in the figures and described below are arbitrary and should not be considered limiting.

FIGS. 1-8 illustrate a variety of sensors used to periodically check filter performance of, for example, a diesel particulate filter (DPF). Each sensor typically includes a collection device that particulate matter and soot not captured (e.g., filtered) by the DPF accumulates or deposits on. The collection device is then visually inspected (e.g., by a user, with an optical sensor, or the like) to provide an indication of how much particulate matter is not being filtered from an exhaust stream. A rate of carbon deposition is determined by measuring the amount of particulate matter accumulation over a predetermined time interval. If the rate of carbon deposition is greater than an allowable threshold, the user knows the DPF is no longer functioning properly and should be replaced.

In some embodiments, a user may temporarily install one of the sensors downstream of a DPF in an exhaust system of an internal combustion engine. The internal combustion engine is then run for a predetermined period of time under predetermined operating conditions such that exhaust from the engine passes through the DPF and over or through the collection device. Afterward, a user or an optical sensor may "read" the collection device to determine the amount of carbon capture (e.g., the amount of particulate matter accumulated on the collection device) versus time of use of the engine, thereby calculating the rate of carbon deposition.

In other embodiments, one of the collection devices may be more permanently mounted in the exhaust system. The exhaust system may then be run under normal operating conditions and, at predefined time intervals (e.g., after a predetermined number of hours of use), a user or an optical sensor may "read" the collection device to calculate the rate of carbon deposition.

Figure 9:
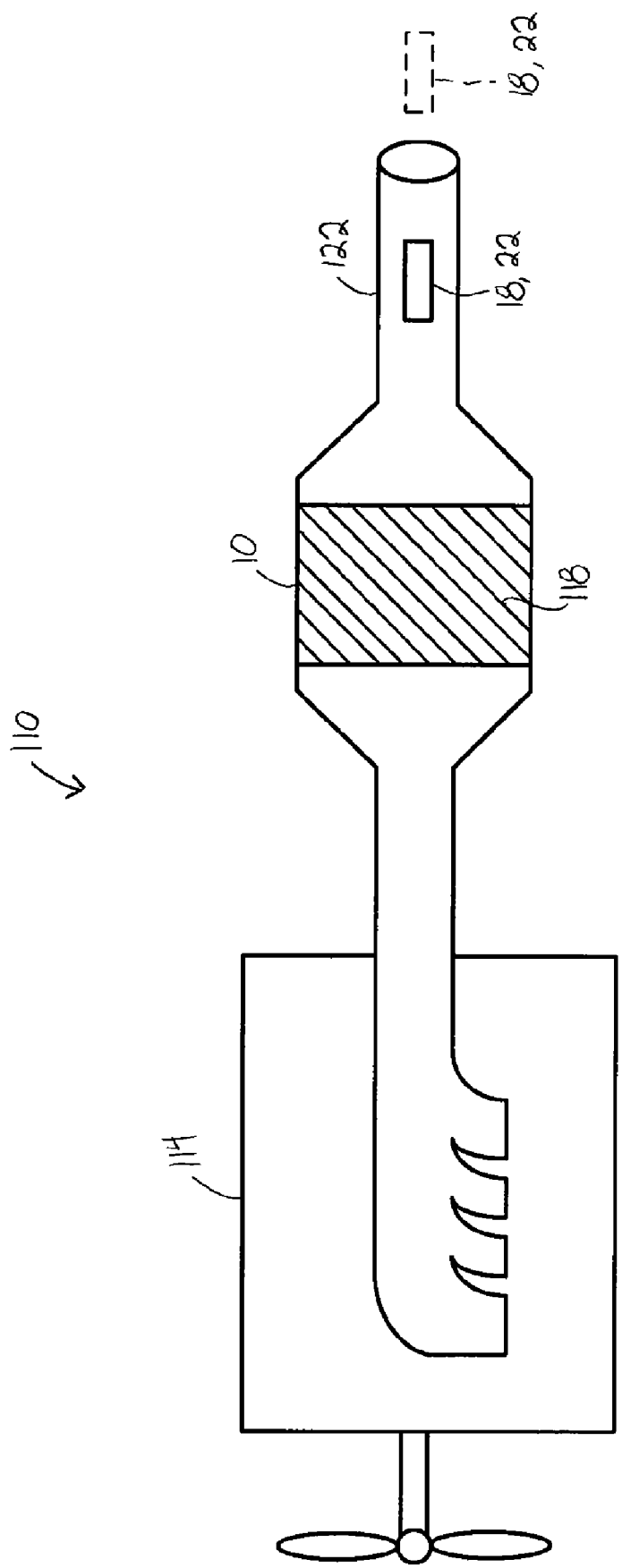
FIG. 9 schematically illustrates an internal combustion engine and an exhaust system including one of the collection devices of FIGS. 1-8.

As shown in FIG. 9, a DPF 10 is mounted in communication with an exhaust system 110 of an internal combustion engine 114 (e.g., a diesel engine) such that exhaust from the engine 114 flows through the DPF 10. The illustrated DPF 10 may be, for example, a disposable DPF or a regenerable DPF. In some embodiments, the internal combustion engine 114 may be part of a semi-tractor trailer, a generator, or the like. As exhaust flows through the DPF 10, a filter element 118 of the DPF 10 captures particulate matter and soot (hereinafter simply 'particulate matter') from the exhaust prior to releasing the exhaust into the surrounding environment. The exhaust system 110 thereby releases clean exhaust (i.e., exhaust that contains substantially no particulate matter) into the environment.

Figure 2:
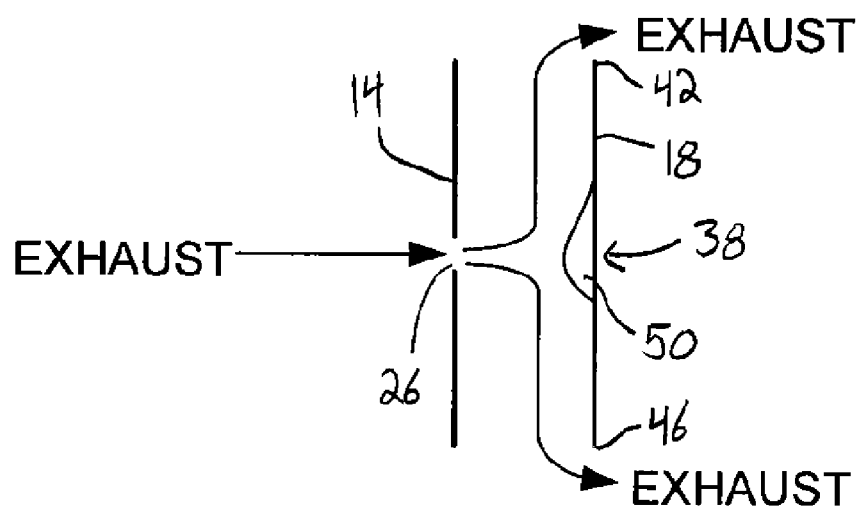
FIGS. 2-8 schematically illustrate additional collection devices for use with a DPF according to other embodiments of the invention.

Referring to FIGS. 1 and 2, the sensor includes an orifice plate 14 and a collection device 18 positioned downstream of the DPF 10 such that particulate matter not captured by the DPF 10 accumulates or deposits on the collection device 18. In the illustrated embodiment, the orifice plate 14 is positioned between the DPF 10 and the collection device 18 and includes an opening 26. In some embodiments, the orifice plate 14 may include multiple openings. The opening 26 provides a controlled flow path from the DPF 10 to the collection device 18 such that a substantial amount of the exhaust contacts the collection device 18. Although the orifice plate 14 is only illustrated in FIGS. 1 and 2 with the collection device 18, it should be readily apparent to one skilled in the art that the orifice plate 14 may also be used with any of the collection devices of FIGS. 3-8, as well as other collection devices. In other embodiments, the orifice plate 14 may be omitted entirely.

Figure 3:
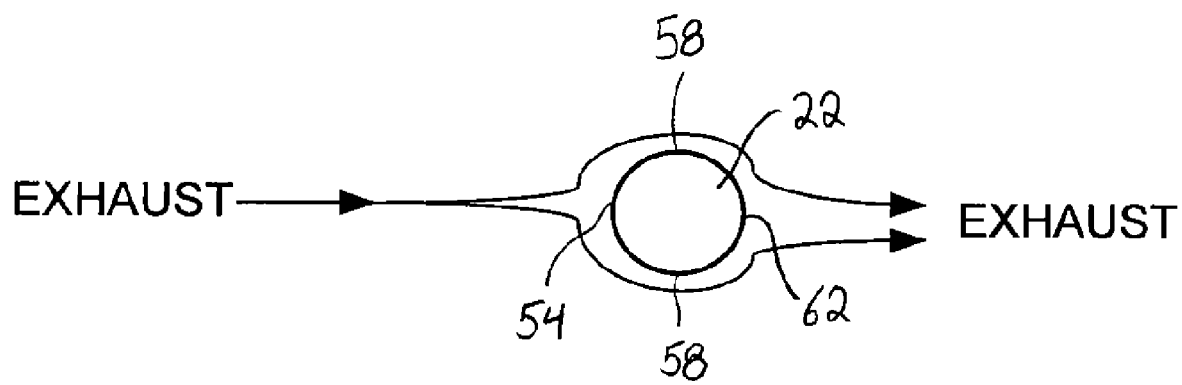

In the embodiment of FIGS. 1 and 2, the collection device includes an accumulation plate 18; while in the embodiment of FIG. 3, the collection device includes an accumulation rod 22. In other embodiments, other suitable structures may alternatively be used as a collection device, and/or a combination of structures may be used to make up a collection device. In the illustrated embodiment, one of the collection devices 18, 22 may be positioned in an engine tailpipe 122 adjacent to an outlet of the DPF 10, as shown in solid lines in FIG. 9, such that the collection device 18, 22 is secured for more permanent mounting. In other embodiments, the collection devices 18 may be positioned just outside of the tailpipe 122, as shown in broken lines in FIG. 9, such that the collection device 18, 22 is easier to access during temporary mounting.

When the engine 114 is running, exhaust flows through the DPF 10, through the opening 26 in the orifice plate 14, and over the collection device 18, 22, which may be positioned in or adjacent to the tailpipe 122. If the DPF 10 is functioning properly, little to no particulate matter remains in the exhaust and, therefore, only minor amounts of particulate matter collect or accumulate on the collection device 18, 22. If the DPF 10 is not functioning properly (e.g., has breached or is leaking), more particulate matter remains in the exhaust such that the particulate matter accumulates at an accelerated rate on the collection device 18, 22.

In the illustrated embodiments, the collection devices 18, 22 are composed of materials suitable for high temperature operations (e.g., up to and greater than about 700° C.). For example, in some embodiments, the collection devices 18, 22 may be composed of ceramic, glass, metal, or the like. In addition, the material of the illustrated collection devices 18, 22 is generally a light colored material or covered with a light colored coating to improve the contrast between the collection devices 18, 22 and the particulate matter.

Figure 1A:
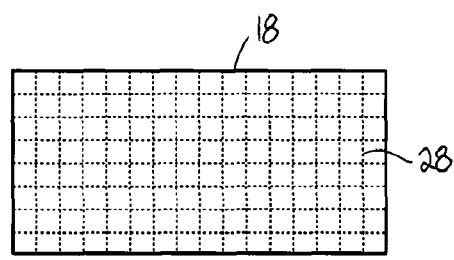
FIG. 1A is a bottom plan view of the collection device shown in FIG. 1.

In some embodiments, the collection device 18, 22 may include a grid such as, for example, grid 28 on the collection device 18 shown in FIG. 1A. The illustrated grid 28 may be painted, etched, embossed, or debossed on the collection device 18. The grid 28 provides a reference for a user to help determine how much particulate matter has accumulated on the collection device 18, 22.

In other embodiments, the surfaces of the collection devices 18, 22 may be texturized to improve the capture and collection of particulate matter on the surfaces and to improve the contrast between the particulate matter and the collection devices 18, 22.

Referring to FIG. 1, the accumulation plate 18 is oriented at a non-perpendicular and non-parallel angle relative to the orifice plate 14 (e.g., at an angle between about one degree and about 89 degrees). When exhaust flows through the opening 26, the exhaust contacts a first, or upstream, portion 30 of the accumulation plate 18 and follows a path defined by the accumulation plate 18. Particulate matter remaining in the exhaust (if any) at first deposits on the upstream portion 30 of the accumulation plate 18. Over time, as the particulate matter continues to accumulate, a second, or downstream, portion 34 of the accumulation plate 18 likewise becomes covered in the particulate matter. Typically, this accumulation occurs over a long period of time. However, if the DPF 10 is breached or leaking such that the DPF 10 no longer properly filters the exhaust, the particulate matter will cover the downstream portion 34 of the accumulation plate 18 much sooner. If the particulate matter covers a predetermined area of the downstream portion 34 and/or reaches a predetermined marker or point on the grid 28 in a relatively short period of time (e.g., the predetermined time interval), a user knows that the DPF 10 is no longer functioning properly and should be replaced or repaired.

Referring to FIG. 2, the accumulation plate 18 is oriented substantially parallel to the orifice plate 14. When exhaust flows through the opening 26, the exhaust contacts a central portion 38 of the accumulation plate 18 first and then flows around a first end 42 and a second end 46 of the accumulation plate 18. Heavy particulate matter 50 remaining in the exhaust (if any) deposits on the central portion 38 since their momentum does not allow them to rapidly change direction with the rest of the exhaust. Over time, the particulate matter 50 continues to deposit on the central portion 38 and spreads toward the first and second ends 42, 46. If the particulate matter 50 reaches a predetermined distance from the ends 42, 46 (which may be identified by the grid 28, a ruler, or other measuring device) in a relatively short period of time, a user knows that the DPF 10 is no longer functioning properly and should be replaced or repaired.

Referring to FIG. 3, the accumulation rod 22 is positioned generally horizontal and transverse relative to an exhaust stream. However, the accumulation rod 22 may be positioned in other orientations relative to the exhaust stream such as, for example, vertically. When exhaust flows toward the accumulation rod 22, the exhaust contacts an upstream, or impact, side 54 of the accumulation rod 22. The exhaust then flows around peripheral edges 58 of the accumulation rod 22 and comes back together near a downstream, or leeward, side 62 of the accumulation rod 22. Similar to the embodiment of FIG. 2, heavy particulate matter in the exhaust (if any) deposits on the upstream side 54 of the accumulation rod 22. Over time, the particulate matter continues to deposit on the upstream side 54 and spreads toward the peripheral edges 58, or even toward the downstream side 62, of the accumulation rod 22. If the particulate matter reaches a predetermined point on the peripheral edges 58 or the downstream side 62 (which may be identified by a grid, a ruler, or other measuring device) in a relatively short period of time, a user knows the DPF 10 is no longer functioning properly and should be replaced or repaired.

As shown in FIGS. 4-7, in some embodiments, the sensor can also include an optical sensor positioned downstream of the DPF 10. The illustrated optical sensor includes a light emitting device 66 (e.g., a laser, an LED, or the like) and a light receiving device 70 (e.g., a photodetector, or the like).

Figure 4:
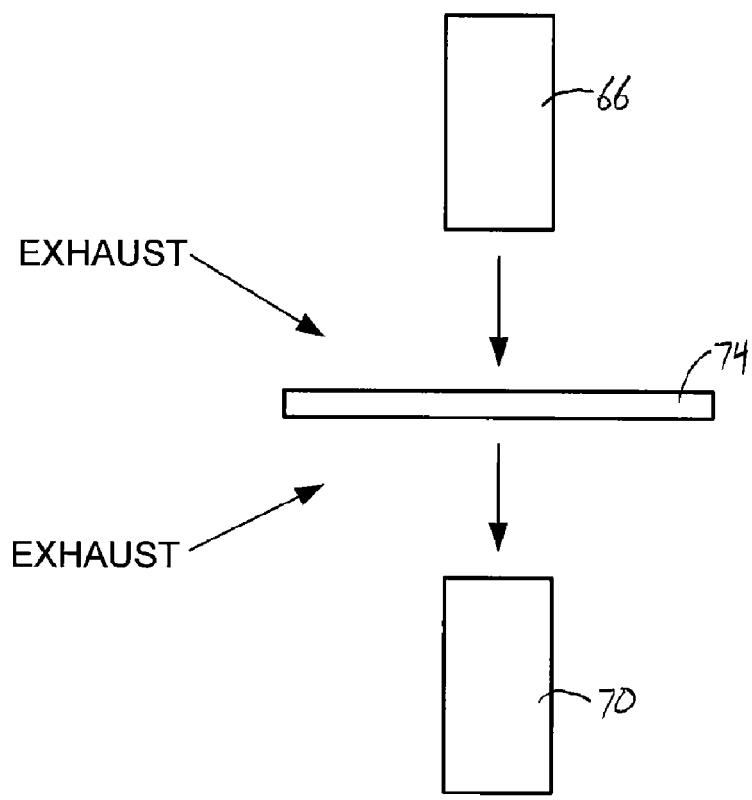

Similar to the previous embodiments, the illustrated light emitting and receiving devices 66, 70 may be positioned with a collection device 74, 78, 82 inside the tailpipe 122 (FIG. 9) adjacent to the outlet of the DPF 10, or may be positioned outside and adjacent to tailpipe 122. In the embodiment of FIG. 4, the collection device includes a window, or optical filter, 74; in the embodiment of FIGS. 5 and 6, the collection device includes a mirror 78; and in the embodiment of FIG. 7 the collection device includes a prism 82.

In the illustrated embodiments, the light emitting device 66, or light source, produces and directs light toward the collection device 74, 78, 82. The light then reflects or refracts off of or passes through the collection device 75, 78, 82 and is directed toward the light receiving device 70, or optical detector. As particulate matter accumulates on the collection device 74, 78, 82, the light is attenuated (e.g., spread, scattered, absorbed, etc.) such that less light reaches the light receiving device 70. The amount or rate of light attenuation is proportional to the amount or rate of particulate accumulation, providing an indication of filter performance.

Similar to the embodiments discussed above with reference to FIGS. 1-3, exhaust flows through an opening in an orifice place and contacts the collection devices 74, 78, 82. In other embodiments, the orifice plate may be omitted. If the DPF 10 is functioning properly, little to no particulate matter remains in the exhaust and collects or accumulates on the collection devices 74, 78, 82. If the DPF 10 is not functioning properly (e.g., has breached or is leaking), more particulate matter remains in the exhaust such that the particulate matter accumulates at an accelerated rate on the collection devices 74, 78, 82, rapidly attenuating light from the light emitting device 66.

Referring to FIG. 4, the window 74 is positioned between the light emitting device 66 and the light receiving device 70 and is generally perpendicular to a path of travel for light between the emitting device 66 and the receiving device 70. In some embodiments, the window 74 may be replaced by an optical filter that functions in a similar manner to the window 74.

When exhaust flows over and past the window 74, the exhaust contacts one or both sides of the window 74. Particulate matter remaining in the exhaust (if any) deposits on the window 74 and begins to accumulate. As the particulate matter accumulates, the light from the emitting device 66 is attenuated such that less light reaches the receiving device 70. If the DPF 10 is not functioning properly, the particulate matter accumulates at a much faster rate, causing the light attenuation rate of change to increase. When the light attenuation rate of change is greater than a predetermined limit, a user knows the DPF 10 is no longer functioning properly and should be replaced or repaired.

Figure 5:
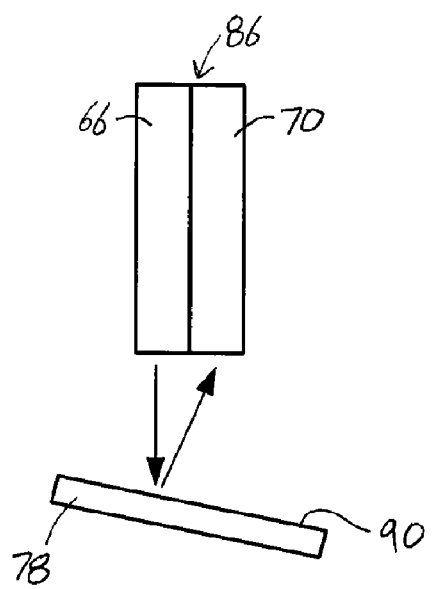
Figure 6:
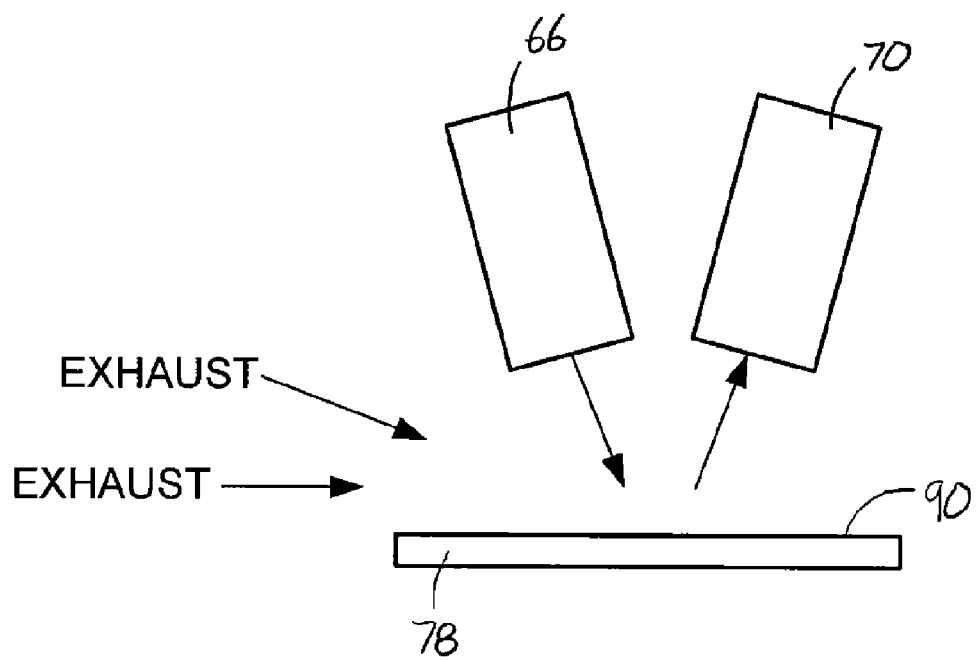

Referring to FIGS. 5 and 6, the mirror 78 is positioned such that light from the light emitting device 66 is reflected back toward the light receiving device 70. As shown in FIG. 5, the light emitting device 66 and the light receiving device 70 are combined into a compact optical sensor 86 and the mirror 78 is skewed or angled relative to the compact optical sensor 86 to reflect the light toward the receiving device 70. As shown in FIG. 6, the mirror 78 is substantially horizontal and the light emitting and receiving devices 66, 70 are skewed or angled relative to the mirror 78 (and to one another) to properly send and receive light.

When exhaust flows over and past the mirror 78, the exhaust contacts a reflective surface 90 of the mirror 78. Similar to the window 74 shown in FIG. 4, particulate matter remaining in the exhaust (if any) deposits on the reflective surface 90 and begins to accumulate. As the particulate matter accumulates, the light from the emitting device 66 is attenuated such that less light reaches the receiving device 70. If the DPF 10 is not functioning properly, the particulate matter accumulates at a much faster rate, causing the light attenuation rate of change to increase. When the light attenuation rate of change is greater than a predetermined limit, a user knows the DPF 10 is no longer functioning properly and should be replaced or repaired.

Figure 7:
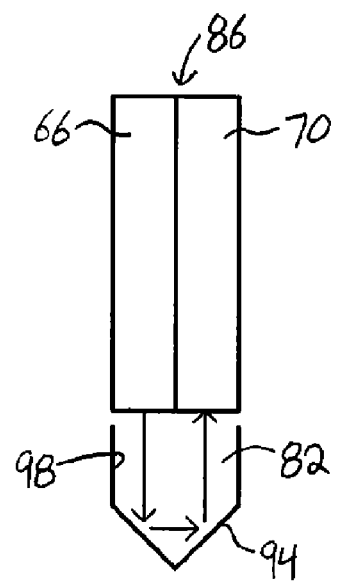

Referring to FIG. 7, the light emitting device 66 and the light receiving device 70 are combined into the compact optical sensor 86 and the prism 82 is positioned on one end of the compact optical sensor 86. The prism 82 is configured to refract light from the emitting device 66 and direct it toward the receiving device 70. In some embodiments, the prism 82 may refract substantially all of the light toward the receiving device 70, while in other embodiments the prism 82 may only refract a portion of the light toward the receiving device 70. Additionally or alternatively, the prism 82 may be a solid prism or a hollow prism. In embodiments where the prism 82 is a solid prism, exhaust only flows around and contacts an outer surface 94 of the prism 82. In embodiments where the prism 82 is a hollow prism, the prism 82 may include one or more apertures such that the exhaust may flow through and contact an inner surface 98 of the prism 82.

When exhaust flows around and/or through the prism 82, the exhaust contacts the outer surface 94 and/or the inner surface 98. Similar to the window 74 and the mirror 78 shown in FIGS. 4-6, particulate matter remaining in the exhaust (if any) deposits on the surfaces 94, 98 of the prism 82 and begins to accumulate. As the particulate matter accumulates, the light from the emitting device 66 is attenuated such that less light reaches the receiving device 70. If the DPF 10 is not functioning properly, the particulate matter accumulates at a much faster rate, causing the light attenuation rate of change to increase. When the light attenuation rate of change is greater than a predetermined limit, a user knows the DPF 10 is no longer functioning properly and should be replaced or repaired.

Figure 8:
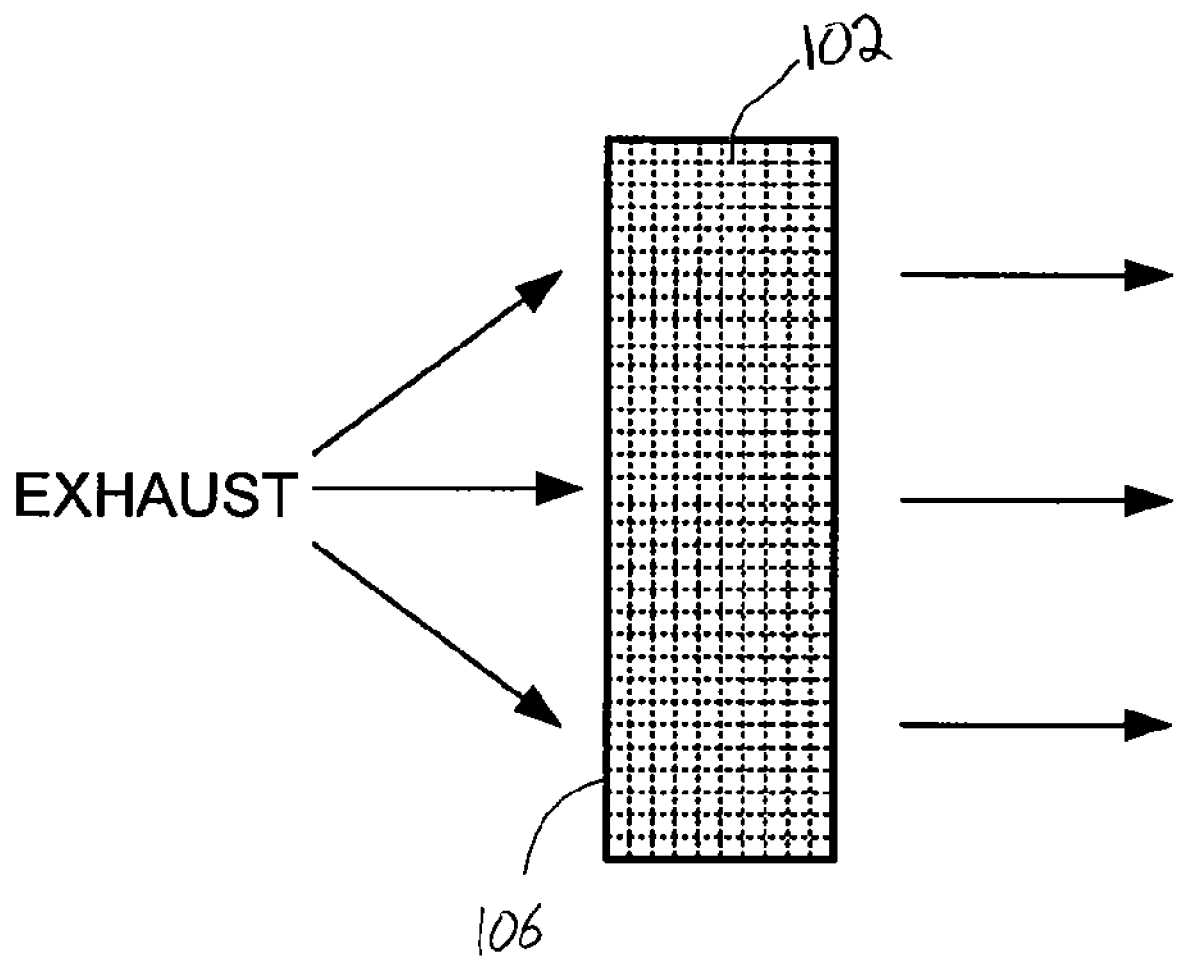

In the embodiment of FIG. 8, the collection device includes an open cell foam structure 102, or other fibrous material structure, that captures particulate matter like a filter or sponge. Similar to the embodiments of FIGS. 1-7, the open cell structure is positioned downstream of the DPF 10 to monitor if the DPF 10 is functioning properly. In some embodiments, an upstream surface 106 of the open cell structure 102 may be monitored (e.g., visually or with an optical sensor) to determine if the DPF 10 is functioning properly or should be replaced or cleaned. In other embodiments, the depth of particulate matter penetration through the open cell structure 102 may be monitored to determine if the DPF 10 is functioning properly.

When exhaust flows through the open cell structure 102, the exhaust contacts the upstream surface 106 and interior surfaces of the structure 102. Particulate matter remaining in the exhaust (if any) deposits on the open cell structure 102 and begins to accumulate. If the particulate matter reaches a predetermined depth through the open cell structure 102 in a relatively short period of time, a user knows the DPF 10 is no longer functioning properly and should be replaced or repaired.

The collection devices 18, 22, 74, 78, 82, 102 shown in FIGS. 1-8 provide a low cost structure and method to positively identify proper functioning of a DPF 10. In addition, the collection devices 18, 22, 74, 78, 82 can be easily cleaned, reset, and returned to service, or can be quickly replaced if they lose their effectiveness.

In some embodiments, the collection devices 18, 22, 74, 78, 82 may be industrially hardened (i.e., made more rugged) for installation on a variety of diesel particulate emission control strategies as a sensor or as a go-no-go test of filter performance.

Various features and advantages of the invention are set forth in the following claims.

What is claimed is:

1. A sensor for use with a diesel particulate filter, the sensor comprising:
   a collection device configured to be positioned downstream of the diesel particulate filter such that particulate matter not captured by the diesel particulate filter accumulates on the collection device;
   wherein the collection device is configured to visually indicate a rate of particulate matter accumulation on the collection device, wherein the rate of particulate matter accumulation corresponds to filter performance.

2. The sensor of claim 1, further comprising an orifice plate configured to be positioned between the diesel particulate filter and the collection device, wherein the orifice plate includes at least one opening to direct exhaust from the diesel particulate filter toward the collection device.

3. The sensor of claim 1, wherein the collection device includes a grid to help determine the rate of particulate matter accumulation on the collection device.

4. The sensor of claim 1, wherein the collection device includes an accumulation plate, and wherein the rate of particulate matter accumulation on a portion of the accumulation plate is monitored to determine filter performance.

5. The sensor of claim 1, wherein the collection device includes an accumulation rod, and wherein the rate of particulate matter accumulation on a portion of the accumulation rod is monitored to determine filter performance.

6. The sensor of claim 1, further comprising a light emitting device and a light receiving device configured to be positioned downstream of the diesel particulate filter, wherein the light emitting device generally directs light toward the collection device and the collection device generally directs the light toward the light receiving device, and wherein a rate of light attenuation between the light emitting device and the light receiving device is proportional to the rate of particulate matter accumulation on the collection device.

7. The sensor of claim 6, wherein the collection device includes a window, wherein the light from the light emitting device passes through the window toward the light receiving device, and wherein particulate matter accumulating on the window increases the rate of light attenuation.

8. The sensor of claim 6, wherein the collection device includes a mirror having a reflective surface, wherein the light from the light emitting device reflects off the reflective surface toward the light receiving device, and wherein particulate matter accumulating on the reflective surface increases the rate of light attenuation.

9. The sensor of claim 6, wherein the collection device includes a prism to refract light from the light emitting device toward the light receiving device, and wherein particulate matter accumulating on the prism increases the rate of light attenuation.

10. The sensor of claim 1, wherein the collection device includes an open cell structure, and wherein the rate of particulate matter accumulation within the open cell structure is monitored to determine filter performance.

11. The sensor of claim 1, wherein the collection device is configured to be read directly by a user.

12. An exhaust system for an internal combustion engine, the exhaust system comprising:
    a diesel particulate filter configured to be positioned downstream of the internal combustion engine to capture particulate matter exhausted from the internal combustion engine; and
    a collection device positioned downstream of the diesel particulate filter such that particulate matter not captured by the diesel particulate filter accumulates on the collection device;
    wherein the collection device is configured to visually indicate a rate of particulate matter accumulation on the collection device, wherein the rate of particulate matter accumulation corresponds to filter performance.

13. The exhaust system of claim 12, further comprising an orifice plate positioned between the diesel particulate filter and the collection device, wherein the orifice plate includes at least one opening to direct exhaust from the diesel particulate filter toward the collection device.

14. The exhaust system of claim 12, wherein the collection device includes a grid to help determine the rate of particulate matter accumulation on the collection device.

15. The exhaust system of claim 12, wherein the collection device includes an accumulation plate, and wherein the rate of particulate matter accumulation on a portion of the accumulation plate is monitored to determine filter performance.

16. The exhaust system of claim 12, wherein the collection device includes an accumulation rod, and wherein the rate of particulate matter accumulation on a portion of the accumulation rod is monitored to determine filter performance.

17. The exhaust system of claim 12, further comprising a light emitting device and a light receiving device positioned downstream of the diesel particulate filter, wherein the light emitting device generally directs light toward the collection device and the collection device generally directs the light toward the light receiving device, and wherein a rate of light attenuation is proportional to the rate of particulate matter accumulation on the collection device.

18. The exhaust system of claim 17, wherein the collection device includes a window, wherein the light from the light emitting device passes through the window toward the light receiving device, and wherein particulate matter accumulating on the window increases the rate of light attenuation.

19. The exhaust system of claim 17, wherein the collection device includes a mirror having a reflective surface, wherein the light from the light emitting device reflects off the reflective surface toward the light receiving device, and wherein particulate matter accumulating on the reflective surface increases the rate of light attenuation.

20. The exhaust system of claim 17, wherein the collection device includes a prism to refract light from the light emitting device toward the light receiving device, and wherein particulate matter accumulating on the prism increases the rate of light attenuation.

21. The exhaust system of claim 12, wherein the collection device includes an open cell structure, and wherein the rate of particulate matter accumulation within the open cell structure is monitored to determine filter performance.

22. The exhaust system of claim 12, wherein the collection device is configured to be read directly by a user.

\* \* \* \* \*